Feb. 23, 1943.  E. P. SUNDHOLM  2,311,708
FLOW CONTROL DEVICE
Filed Nov. 22, 1940  2 Sheets-Sheet 1
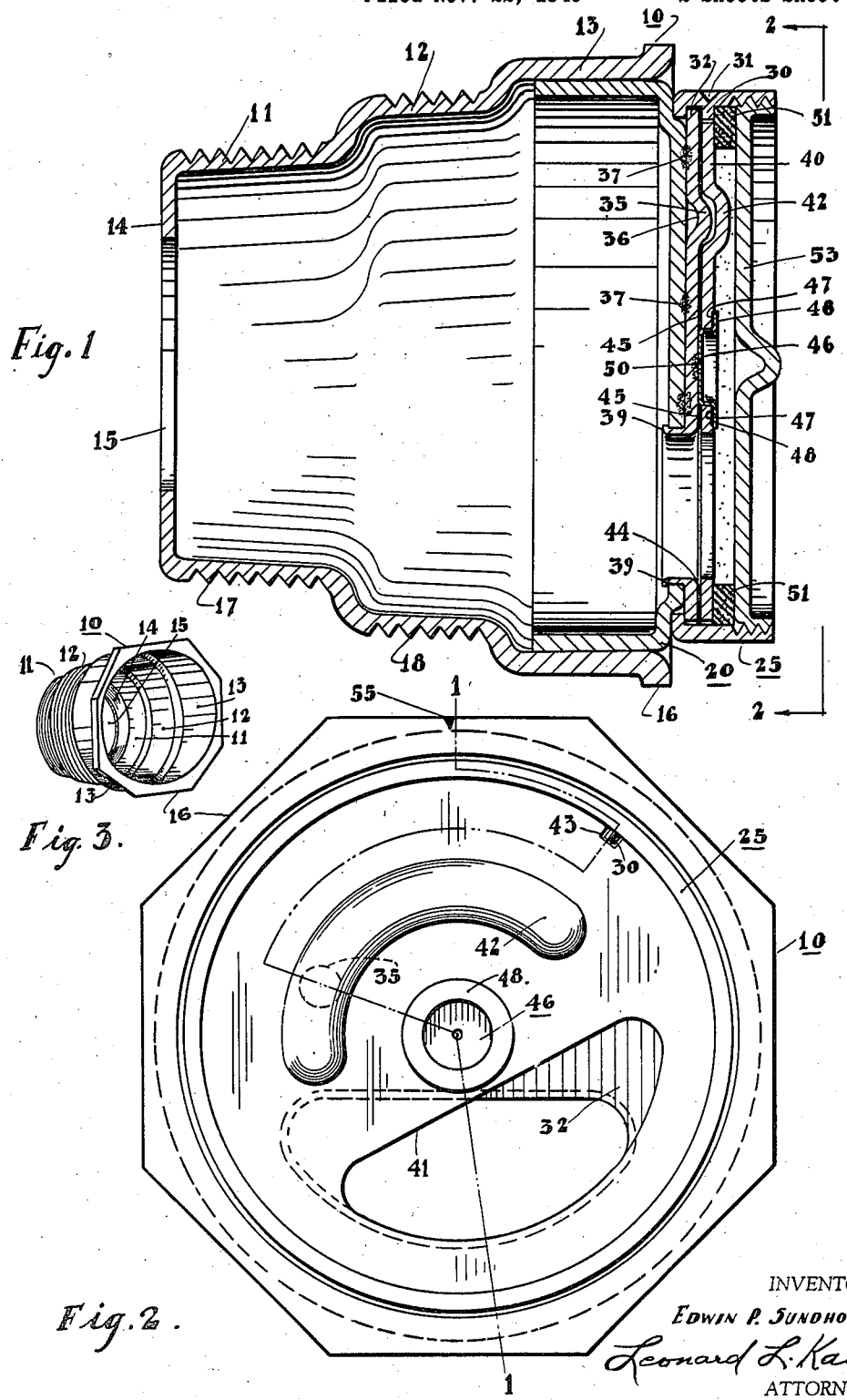
INVENTOR.
EDWIN P. SUNDHOLM
Leonard L. Kalish
ATTORNEY.

Feb. 23, 1943.   E. P. SUNDHOLM   2,311,708
FLOW CONTROL DEVICE
Filed Nov. 22, 1940   2 Sheets-Sheet 2
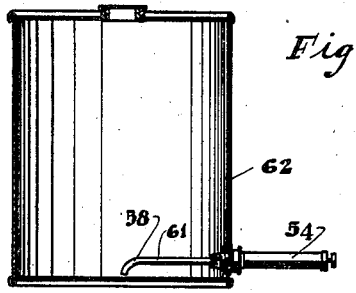
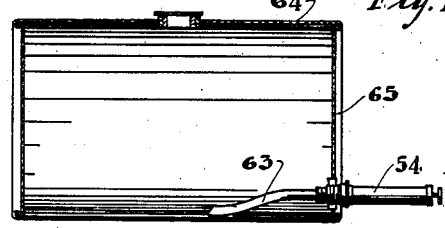
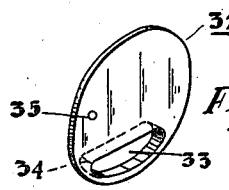
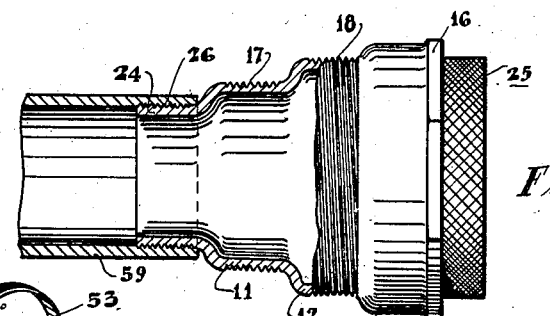
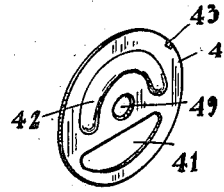
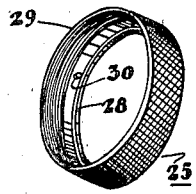
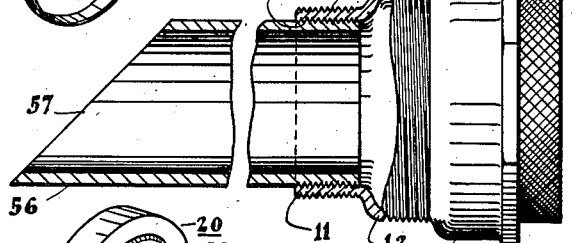
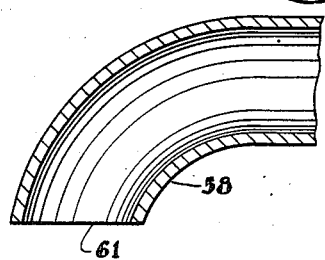
INVENTOR.
Edwin P. Sundholm
BY Leonard L. Kalish
ATTORNEY.

Patented Feb. 23, 1943

2,311,708

UNITED STATES PATENT OFFICE 2,311,708

FLOW CONTROL DEVICE

Edwin P. Sundholm, Albert City, Iowa

Application November 22, 1940, Serial No. 366,607

4 Claims. (Cl. 284—14)

The present invention relates to a certain new and useful flow-control device adapted for use in conjunction with fluid-containers and reservoirs, as for instance sheet-metal tanks, drums, containers or the like, or any other tanks, drums, containers or the like, whereby, fractional portions of the fluid contents of the container may be more effectively and more conveniently withdrawn from time to time into any suitable tubular receiving member into which the contents of the container are to be dispensed.

In discharging the fluid contents of a container, either at one time or by successive periodic discharges of fractional portions of the contents, it is often desirable not to permit the discharged fluid to come into open contact with the outside air after it leaves the container, but instead to discharge it directly into any vessel, such as a pipe, tube or the like, or to a pipe, tube or the like, which is connected to the discharge opening of the container. In such instances it is therefore necessary first to unplug the discharge opening of the container by removing the usual conventional screw plug, for instance, and then to secure or otherwise fasten into the discharge opening (in place of the plug), the pipe, tube, or other member into or through which the fluid contents are to be discharged. In such instances, it is a matter of some concern to get the tubular receiving member into operative connection with the discharge opening of the container after the closure plug has been removed therefrom, without spilling any of the fluid from the time that the plug is removed to the time that the tubular receiving member is connected to the discharge opening.

The object of the present invention is to provide a flow-control device which may be used in place of the conventional closure plug in the discharge opening of a fluid container, and which is adapted to receive, and, if desired, to make coupled connection with any suitable tubular receiving member and which is adapted to control the flow of fluid thereto by rotary motion about an axis generally coincident with the axis of the container opening, and which rotary motion may be induced by the rotation of the tubular receiving member during the act of coupling and uncoupling of such tubular receiving member in relation to the flow-control device.

Thus, for example, the present invention may be used in the dispensing of more or less viscous fluids such as the various grades of greases, printing inks, or the like, some cans, drums or other containers having relatively large amounts of said fluids (as for example ten, twenty-five, fifty or a hundred or more pounds) and is suitable for use in filling the small portable-type grease-guns exemplified in United States Patents Nos. 2,024,097, 2,124,077, 1,587,597, 1,692,423, 1,696,606, 1,619,126, 1,377,023, 1,894,274, and 1,926,398 in which the generally cylindrical fluid-reservoir or so-called "barrel" has within it a follower-piston and in which said cylindrical fluid-reservoir or "barrel" may be refilled from time to time by unscrewing or otherwise detaching from it the pump portion of the device (which is sometimes referred to as the "head" or high-pressure "head" of the grease-gun) and by then submerging the thus-opened end or free end of the barrel of the grease-gun into a supply of grease and manually withdrawing the follower-piston in said gun-barrel by a suitable piston-rod or pull-rod or chain so as to suck said gun-barrel full of grease.

With the above and other objects in view, which will appear more fully from the following specification and appended claims and from the accompanying drawings, the present invention consists of a certain flow-control device including the generally tubular portion adapted for detachable and fluid-sealing engagement within the discharge opening of any conventional container, and a second tubular portion co-axial with the first tubular portion and rotatably connected therewith, and adapted detachably to receive and to make rapidly-detachable connection with a tubular receiving member, fluid-conducting passageways through each of said tubular members communicable with each other, and shut-off means operable by the relative rotary motion of said tubular portion about their common axis for opening and closing, at will, said fluid-passageway between said two tubular portions.

The present invention further consists of other novel features, as well as certain novel details of construction, all of which will appear more fully from the following detailed description and accompanying drawings.

In the accompanying drawings, in which like reference characters indicate like parts throughout, Figure 1 represents an axial cross-section view, on an enlarged scale of approximately two to one, of a flow-control device representing one embodiment of the present invention, taken generally along the line 1—1 of Figure 2.

Figure 2 represents an end elevation view, on an enlarged scale of approximately two to one, of the same, as viewed generally along the lines 2—2 of Figure 1.

Figure 3 represents a perspective view, on a reduced scale, of the relatively stationary tubular portion of the flow-control device of the present invention, which is adapted to be secured in the discharge opening of the container.

Figure 4 represents a perspective view of a head, having an opening therein which is adapted to be secured in the larger end of the tubular portion shown in Figure 3.

Figure 5 represents a perspective view of the base plate 32 which forms a part of the flow-control device illustrated in Figures 1 and 2.

Figure 6 represents a perspective view of the relatively rotatable ring-like tubular member 25, forming part of the flow-control device illustrated in Figures 1 and 2.

Figure 7 represents a perspective view of the rotatable shut-off disc 40 forming part of the flow-control device shown in Figures 1 and 2.

Figure 8 represents a perspective view of a sealing member which may be used with the embodiment shown in Figures 1 and 2.

Figure 9 represents an axial cross-sectional view of a modified form of construction embodying the present invention.

Figure 10 represents an axial cross-sectional view of still another embodiment of the present invention.

Figure 11 represents an axial cross-sectional view of one embodiment somewhat like that of Figure 9 illustrating one method of forming the end of the inner pipe thereof, which has an external thread.

Figure 12 represents a vertical cross-sectional view of a drum equipped with a threaded outlet opening in the lower portion of the side wall thereof, into which there has been inserted the embodiment of the present invention shown in Figure 11.

Figure 13 represents a vertical cross-sectional view of a drum equipped with a threaded outlet opening in one end or head thereof, equipped with the embodiment of the present invention shown in Figure 9, said embodiment illustrating a means for forming the inner tube thereof, alternative to that shown in Figure 11.

In the embodiment of the invention shown in Figures 1 to 8 inclusive of the drawings, a stationary member 10 is formed with three coaxial cylindrical portions, the innermost portion 11 having the smallest diameter, and the center portion 12 having a larger diameter, and the outermost portion 13 having the largest diameter as shown in Figures 1 and 3. The inner and smaller end 14 of the member 10 contains the centered opening 15. The outer edge of the portion 13 is flared outwardly into a gripping portion 16 by which the member 10 may be gripped from without, as for instance by a wrench, spanner wrench or the like. The gripping portion 16 may be formed in any suitable polygonal shape as for instance, in the octagonal shape indicated in the drawings. The cylindrical portion 11 is provided with the external thread 17 while the cylindrical portion 12 is provided with the external thread 18.

A generally cup-like member 20 is provided having a generally cylindrical portion 21 and a flat terminal wall 22. The terminal wall 22 has a pressed-out portion 23 of somewhat smaller diameter than that of the cylindrical portion 21. A generally elongated opening 27 is provided in the pressed-out portion 23 of the terminal wall 22.

The outside diameter of the cylindrical portion 21 of the cup-like member 20 is very slightly greater than the inside diameter of the outermost cylindrical portion 13 of the member 10. Thus, it is possible to insert the cylindrical portion 21 of the member 20 within the cylindrical portion 13 of the member 10 by sweating or in any other suitable way so that the member 20 will be held firmly within the cylindrical portion 13 of the member 10 with only the pressed out portion 23 of the member 20 protruding beyond the gripping portion 16 of the member 10. The member 20 will thereupon be held more or less permanently within the portion 13 of the member 10.

The relatively rotatable ring-like tubular socket-member 25 is provided with a slight inturned terminal flange 28, and may be internally threaded as at 29 to receive any externally threaded tubular member into which the sealed drum, barrel, tank or other container is to be discharged from time to time. The member 25 instead of being threaded internally as indicated in the drawings, may be threaded externally or may be provided with a bayonet catch instead of a screw-thread or with any other connecting means.

At a point spaced slightly from the inturned flange 28, an inward radial projection or lug 30 is provided in the ring 25, as for instance by indenting or pressing the side wall of the ring inwardly as at 31 while the ring is supported from within by a die having a suitable depression corresponding to the desired shape of the lug 30, thereby forcing the metal into the depression and forming the lug 30 integrally with the ring 25.

Between the inturned flange 28 and the lug 30, a base plate 32 is positioned with just sufficient clearance to permit relative rotation between the ring 25 and the base plate 32. The base plate 32 may be inserted into the ring by inserting one edge of the ring beneath the lug 30 while the plate 32 is held at an angle and by then permitting the rest of the plate 32 to set against the flange 28.

The base plate 32 is provided with a port opening 33 of the same general contour as the hole 27 in the terminal wall 22 of the member 20, but slightly smaller, and the plate 32 is also provided with a crimping flange or sealing flange or bushing 34 drawn from the metal of the plate and having the same general cross-section as the opening 27. That is, the sealing flange 34 surrounds the port opening 33 in the base plate 32.

The plate 32 may also be provided with a stop lug 35 pressed outwardly (in the direction opposite that of the flange 34) therefrom at a suitable point, by the same method used for the production of the lug 30, that is, by indenting the metal from the opposite side as at 36.

The base plate 32, surrounded by the ring 25, is then applied to the stationary cup-like member 20 by inserting the flange or bushing 34 of said plate 32 through the opening 27 and by spot-welding, soldering or riveting the base plate 32 to the terminal wall 22 at a suitable number of points, as for instance at the spots 37, thereby firmly to unite the base plate 32 to the terminal wall 22. By this union, the ring 25 is held in place against axial displacement, because the inturned flange 28 thereof will be disposed between the shoulder 38 of the cup-like member 20 and the peripheral portion of the base plate 32, the flange 28 surrounding the pressed out portion 23 of the wall 22; there being just enough clearance to permit free rotation of the ring 25 in relation to the relatively stationary cup-like member 20 and the base plate 32 which is fastened to the cup-like member 20.

Thereafter, the bushing or flange 34, drawn from the base plate 32, is flared over on the inside of the terminal wall 22 as indicated at 39 and pressed tightly in place so as to form a fluid-tight seal against the pressed out portion 23 of the wall 22.

A shut-off disc 40 having a port opening 41 corresponding to the port opening 33 is provided with an arcuate raised channel 42 of an arcuate extent slightly greater than the arcuate extent of the ports 33 and 41 and so disposed in relation to the port 41 and the stop lug 35, that the lug 35 will project into it and will act as a stop to limit the rotary motion of the shut-off disc 40 to the open and closed positions thereof.

The shut-off disc 40 is also provided with a notch 43 at a suitable point in the periphery thereof, to receive the lug 30, thereby to form an interlocking connection between the ring 25 and the shut-off disc 40, thus causing the disc 40 to rotate in unison with the ring 25. A thin, annular sealing gasket 44 of any suitable thin gasket material may be interposed between the base plate 32 and the shut-off disc 40, said gasket 44 being placed radially outwardly from the ports 33 and 41. If desired, a similar sealing gasket may also be interposed between the base plate 32 and the shut-off disc 40; this sealing gasket being disposed radially inwardly from the ports 33 and 41, as for instance at the point 45. If desired, the second annular sealing gasket may be placed instead, between the shut-off disc 40 and the flanged cup-like retainer disc 46 at the point 47 between the retaining flange 48 of the disc 46.

The retainer member 46 extends through the opening 49 of the shut-off disc 40 and is spot-welded to the base plate 32 as at 50, thereby completing the permanent assembly of the device.

A sealing gasket 51 may be provided within the socket ring 25 for sealing against the end of any tubular receiving member which may be screwed into the socket 25 for receiving the fluid contents of the drum, barrel, tank or the like, into the bung hole of which, the device may be mounted.

By so arranging the screw thread 29 or the bayonet catch or other fastening means associated with the ring 25, and also the relative disposition of the ports 33 and 41 and the stop 35, that the coupling of any tubular receiving member to the socket 25 involves a rotary motion in the direction in which the shut-off disc 40 is turned to the open position and so that the uncoupling of any tubular receiving member from the socket 25 involves a rotary motion in the direction in which the shut-off disc 40 is turned to the closed position, the entire flow-control device may be operated by the mere insertion and removal of the tubular receiving member (such as a pipe or pipe-fitting or like member). Thus, when inserting the tubular receiving member into the socket 25 by a rotary motion in the clock-wise direction, the friction between it and the ring 25 is sufficient to rotate the ring until it is turned into the open position while the uncoupling of the same tubular receiving member will turn the ring to the closed position. If the initial friction between the ring 25 and the receiving member is not sufficient, then a continued rotation of the tubular receiving member after it has contacted the sealing gasket 51 will be sufficient to cause a rotation of the ring.

When the flow-control device is not discharging, that is, when it is in the closed position on the drum to which it is attached, any conventional closure plug 53 may be inserted into the socket ring 25 thereby more securely to seal the barrel, drum or tank against leakage of fluid.

It should be noted that whether the tubular receiving member 54 or whether the closure plug 53 is screwed tightly into the socket ring 25, the pressure of either of these members against the sealing gasket 51 is transmitted to the shut-off disc 40 which is thereby pressed more firmly against the base plate 32 or against the sealing gasket 44 and/or 45 intervening the same, thereby to intensify the fluid-seal between the stationary base plate 32 and the rotary shut-off disc 40, so as further to guard against possible leakage of fluid while the barrel, drum or tank is standing idle or while it is in storage or in transit.

It should also be noted that, because of the union of the base plate 32 with the pressed out portion 23 of the wall 22 by a spot-welding or the like, the strain to resist dislodgment of these two members in relation to each other is not borne by the generally tubular flange or bushing 34 which is thereby enabled more surely to retain a fluid-seal.

The stationary member 10 and the cup-like member 20 as well as the socket ring 25 are preferably drawn out of or formed of flat sheet metal such as sheet steel of suitable thickness according to the size of the device and the use to which it is to be put. The other parts are likewise preferably pressed or drawn out of sheet metal such as sheet steel or the like. The socket member 25 may be formed of a metal tube cut to the desired length with one end flanged or flared inwardly to produce the inturned flange 28.

The members 10 and 20 and also the ring 25 may be formed by other means, as for instance in the form of castings such as die castings, or they may be cold drawn of suitable metals by suitable die drawing or cold flowing operations.

Any suitable mark such as the mark 55 may be provided at a point diametrically opposed to the radial center line of the opening 27, to indicate the part member 10 which should be turned to the top when the plug is screwed into the bung hole of the barrel, drum, tank or the like, so that the opening 27 in the member 20 will be at the bottom, thereby enabling all of the fluid to be withdrawn.

The external thread 17 on the cylindrical portion 11 of the member 10 and the thread 18 on the portion 12 may be of any suitable outside diameter as will fit into the most commonly used sizes of internally-threaded bung-holes or openings on drums or other containers. The embodiment shown in the drawings illustrates the two different sized external threads 17 and 18 whereby the flow-control device of the present invention can be adapted to use in bung-holes of two different sizes (as for example 1¾" and 2¼" diameter). When the device is to be used in a bung hole having a smaller diameter, attachment will be made by means of the thread 17; the thread 18 merely projecting outside of the drum or other container. Where the present invention is to be used in a bung-hole or other outlet opening having a greater diameter, attachment will be made by means of the thread 18; the cylindrical portion 11 projecting inside of the drum or other container. It is, of course, possible to construct the present invention with only a single thread corresponding to 17 or 18 and such construction is contemplated by and within the scope of the present invention. Similarly, it is possible to construct the present invention with three or more different-sized threads so that it can be used on a wider range of container-openings.

In Figure 10 is shown a modified form of construction of the present invention in which the member 10 is cut off sharply at the inner end of its portion 11 (instead of having the inner end 14 shown in Figures 1 and 3) and in which the cylindrical portion 11 has, in addition to its external thread 17, an internal thread 19. A tube or pipe 56 which has an external thread and which is of a size appropriate to permit said tube 56 to be screwed into the internal thread 19. Thus, when the member 10 is screwed into the outlet opening of a drum or other container of fluid, the tube 56 will extend within the drum so that the fluid will be drawn off, more or less from the center portion of said drum. The inner end of the tube 56 may be cut off at an angle as shown at 57 in Figure 10, or the end may be cut off with a straight cut, or the end may be given a downward bend as shown at 58 in Figure 11 so that it will be possible to draw off even the small amount of fluid which would otherwise remain at the very bottom of the container.

In Figure 9 is shown another modification of the present invention in which the member 10 contains an additional cylindrical portion 24 which is disposed next to the portion 11 and which has a smaller diameter than said portion 11. The inner edge of the portion 24 is cut off sharply and said portion 24 is externally threaded as at 26. Thus, a tube or pipe 59 which is internally threaded and of a suitable dimension to be screwed into the thread 26 can be attached to said stationary member 10 so that it extends (in use) into the drum or other container to which the present invention is attached. The end of this pipe 59 can be given a straight cut or an angled cut or it can be given a downward bend (as shown at 58 in Figure 11) or the tube 59 may be bent at a slight angle, shown in Figure 13, so that the end thereof may approach more closely to the bottom of the container.

In Figure 11 is shown an embodiment of the present invention which is similar to that shown in Figure 9 with the exception that the innermost and smallest cylindrical portion 24 of the stationary member 10 contains an internal thread 60 (in place of the external thread 26 shown in Figure 9). A tube or pipe 61 which is externally threaded and of a size appropriate to be screwed into the thread 60, is attached to the member 10 and extends inwardly therefrom within the drum or other container to which the present invention is attached. As shown in Figure 11, the inner end of said tube 61 may be given a downward bend as at 58 so that all of the fluid may be sucked out of the container; it is possible, however, to make the end of the tube 61 with an angled cut or a straight cut or the tube 61 may be bent slightly at an angle as shown in Figure 13.

Any of the tubes or pipes 56, 59, 61 and 63 may also alternatively be screw-threaded or otherwise secured into the opening 15 shown in Figure 1 by merely internally screw-threading the opening 15 and externally screw-threading the pipe-end with a suitably fine thread, or by swaging, ferruling or expanding or other means.

In Figure 12 is shown the embodiment of the present invention as set forth in Figure 11, as it appears when connected to a drum or tank 62 having an outlet opening at the bottom of the side wall thereof; a tubular receiving member 54 being shown attached to the socket member 25.

In Figure 13 is shown the embodiment set forth in Figure 10 but with the inner tube 56 bent downwardly at a slight angle, as shown at 63, as the device appears when it is attached to a drum 64 which has an outlet opening in the end wall 65 thereof; a tubular receiving member 54 being shown attached to the socket member 25.

The stationary members 10 and 20 (both in the embodiment shown in Figures 1 and 3 as well as the embodiment shown in Figures 9, 10 and 11) may be either a casting of iron, brass, aluminum, or the like, or they may be die-castings, that is, cast into a die with the molten metal forced in under substantial fluid pressure, or they may also be pressed out of sheet metal. The stop lug 35 may be pressed out of the wall 22 or may be merely cast integrally therewith, or instead, it may be super-added in the form of a small rivet, screw, pin, or the like.

In the form of construction illustrated in Figures 1 to 8 inclusive, the base plate 32 may be secured to the end wall 22 by means other than the spot-welding shown, as for instance by riveting or the like.

Instead of a single pair of ports 33 and 41, several pairs of smaller ports may be used; these may be closely spaced or may be distributed around the circumference.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new, and desired to be secured by Letters Patent, is:

1. A flow-control device adapted for use in the bung-opening of a barrel, drum, tank or the like, comprising a relatively stationary, pressed sheet-metal plug member having an outer cylindrical seating portion and an inner co-axial cylindrical engaging portion, said engaging portion having a smaller diameter than said seating portion and being threaded, whereby it may be detachably secured to said bung-opening, said plug member having its outer and inner ends open; a cup-like partition member having a cylindrical portion more or less permanently and immovably seated within said seating portion of said plug member in telescopic relation thereto and forming a fluid-tight seal therewith, and having an end-wall projecting outwardly from said plug member, said end-wall having a port therein; a socket-member rotatably secured to said end-wall and being generally co-axial with said plug member; means associated with said socket for opening and closing the port in said end-wall by opposite rotational displacements of said socket; and means limiting the rotary motion of said socket to the open and closed positions thereof.

2. A flow-control device adapted for use in the bung-opening of a barrel, drum, tank or the like, comprising a relatively stationary, pressed sheet-metal plug member having an outer cylindrical seating portion and a plurality of inner co-axial cylindrical engaging portions, said engaging portions having successively smaller diameters, the innermost portion having the smallest diameter, said engaging portions being threaded, whereby said plug member can be detachably secured to any bung-opening of a size corresponding to one of said engaging portions, said plug member having its outer and inner ends open; a cup-like partition member having a cylindrical portion more or less permanently and immovably seated within said seating portion of said plug member in telescopic relation thereto and forming a fluid-tight seal therewith, and having an end-wall projecting outwardly from said plug member, said end-wall having a port therein; a socket-member rotatably secured to said end-wall and being generally co-axial with said plug member; means associated with said socket for opening and closing the port in said end-wall by opposite rotational displacements of said socket; and means limiting the rotary motion of said socket to the open and closed positions thereof.

3. A flow-control device adapted for use in the bung-opening of a barrel, drum, tank or the like, comprising a relatively stationary, pressed sheet-metal plug member having an outer cylindrical seating portion and a plurality of inner co-axial cylindrical engaging portions, said engaging portions having successively smaller diameters, the innermost portion having the smallest diameter, said engaging portions being threaded, whereby said plug member can be detachably secured to any bung-opening of a size corresponding to one of said engaging portions, said plug member having its outer and inner ends open; a pipe detachably secured to the inner end of said plug member and extending inwardly therefrom and adapted to terminate near the central and lowermost portion of said barrel, drum, tank or the like; a cup-like partition member having a cylindrical portion more or less permanently and immovably seated within said seating portion of said plug member and forming a fluid-tight seal therewith, and having an end-wall projecting outwardly from said plug member, said end-wall having a port therein; a socket-member rotatably secured to said end-wall and being generally co-axial with said plug member; means associated with said socket for opening and closing the port in said end-wall by opposite rotational displacements of said socket; and means limiting the rotary motion of said socket to the open and closed positions thereof.

4. A flow-control device adapted for use in the bung-opening of a barrel, drum, tank or the like, comprising a relatively stationary, pressed sheet-metal plug member having an outer cylindrical seating portion and a plurality of inner co-axial cylindrical, engaging portions, said engaging portions having successively smaller diameters, the innermost portion having the smallest diameter, said engaging portions being threaded, whereby said plug member can be detachably secured to any bung-opening of a size corresponding to one of said engaging portions, said plug member having its outer and inner ends open; a cup-like partition member having a cylindrical portion more or less permanently and immovably seated within said seating portion of said plug member and forming a fluid-tight seal therewith, and having an end-wall projecting outwardly from said plug member, said end-wall having an off-center port therein; a base plate secured to said partition member, said base plate having an opening therethrough corresponding to said port, said opening having a peripheral sealing bushing extending through said port and flared outwardly on the opposite side thereof, thereby to form a fluid-tight seal therewith; a socket-ring surrounding said base plate and pivotally related thereto and having an inturned locking flange intermediate said partition member and said peripheral zone, whereby said socket-ring is confined against axial displacement; a shut-off disc within said socket-ring pivotally secured to said base plate and having an off-center opening therein; and means interlocking said shut-off disc and said socket-ring whereby opposite rotations of said socket-ring will cause said shut-off disc to be moved to bring the opening therein into and out of registration with the passageway formed by said port and the opening in said base plate.

EDWIN P. SUNDHOLM.